INVENTORS
LUTZ HORN
FRITZ PHILIPP
BY Michael S. Striker,
ATTORNEY

United States Patent Office 3,516,870
Patented June 23, 1970

3,516,870
SAFETY VALVE FOR ELECTRIC STORAGE CELLS
Lutz Horn, Erlangen, and Fritz Philipp, Hagen-Haspe, Germany, assignors to Varta Aktiengesellschaft, Frankfurt am Main, Germany
Filed Oct. 13, 1967, Ser. No. 675,080
Claims priority, application Germany, Oct. 19, 1966, V 19,544
Int. Cl. H01m 1/06; B65d 51/16
U.S. Cl. 136—178                                    3 Claims

ABSTRACT OF THE DISCLOSURE

An electric storage cell whose housing has a cover provided with a circular opening for the stem of a valve member whose head overlies the outer end of the opening and is biased to sealing position by a leaf spring connected to a cap whose marginal portion is coupled to the outer side of the cover, either directly by upsetting a collar at the outer side of the cover or by means of a coupling sleeve which is anchored in the cover and has an edge portion bent over the marginal portion of the cap. The latter has a gas evacuating aperture and extends only slightly beyond the cover, i.e., just enough to permit movement of the valve member to open position when the pressure of gas in the housing exceeds a predetermined value.

One terminal of the cell is welded to the inner side of the cover.

BACKGROUND OF THE INVENTION

The present invention relates to electric storage cells or accumulators in general, and more particularly to improvements in storage cells which are provided with a fluidtightly sealed housing for electrolyte. Still more particularly, the invention relates to improvements in relief valves or safety valves provided in storage cells to establish a path for escape of gases when the pressure in the cell housing rises beyond a predetermined value.

Many presently known fluidtight storage cell housings are provided with safety valves which are destroyed and permit escape of gases when the pressure in the housing reaches a certain value. Such valves normally comprise diaphragms which burst in response to a certain gas pressure. A serious drawback of the just outlined safety valves is that they cannot be reused, i.e., that the housing must be discarded once its valve is destroyed or that the valve must be replaced with a fresh one.

It is also known to provide a storage cell with a relief valve or safety valve wherein a valve member is biased to sealing position by a helical spring. The spring yields to a certain pressure and permits escape of gases from the housing. Such valves are quite bulky and portions thereof often extend well beyond the outline of the housing so that they are likely to be damaged in storage or transport. Furthermore, these valves are rather expensive and cannot be employed on all types of cell housings, and they also extend into the interior of the housing.

SUMMARY OF THE INVENTION

It is an object of our invention to provide a novel and improved safety valve or relief valve for use in electric storage cells and to construct and assemble the valve in such a way that it occupies little room, that it can respond to an accurately determined pressure of gases in the cell housing, that it cannot be damaged in storage, transport or actual use of the cell, that it can be readily installed in all or nearly all types of cells, and that it comprises a small number of simple parts.

Another object of the invention is to provide a safety valve which can be produced at reasonable cost, whose component parts can be manufactured and assembled in available machinery, and whose parts need not be produced with a high degree of precision.

A further object of the invention is to provide an electric storage cell which embodies a valve of the just outlined character.

Briefly outlined, the invention is embodied in a storage cell which comprises a housing having an opening therein, such opening being preferably provided in a cover which is sealingly connected with the main portion or jar of the cell housing, and novel safety valve which includes a valve member having a sealing portion movable with reference to the opening between a sealing position and an open position, and apertured retaining means externally coupled to the housing and comprising biasing means for urging the sealing portion of the valve member to sealing position. The retaining means further includes a cupped cap whose marginal portion is directly or indirectly coupled with the housing and which defines a shallow chamber receiving the sealing portion of the valve member. The biasing means preferably includes a single leaf spring which is installed in the chamber of the cap and bears against the valve member. The marginal portion of the cap can be connected to a collar of the housing which is deformed over the marginal portion, or to a deformable coupling sleeve which extends through the opening of the housing and has an edge portion which is upset to overlie the marginal portion of the cap.

The novel features which are considered as characteristic of the invention are set forth in particular in the appended claims. The improved safety valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
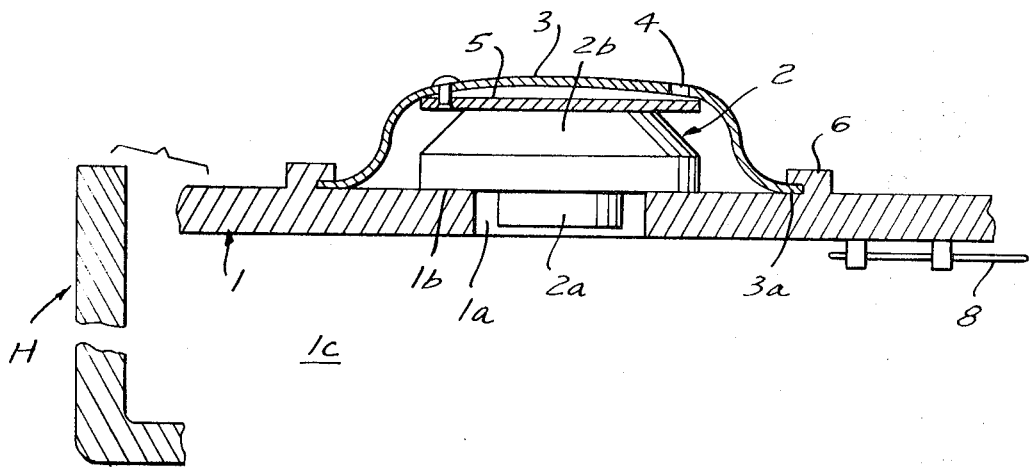
FIG. 1 is a fragmentary central vertical sectional view of a storage cell whose safety valve embodies one form of our invention.

Referring first to FIG. 1, there is shown a portion of an electric storage cell or accumulator which comprises a housing H including a solid top wall or cover 1 provided with a circular opening 1a and defining an annular seat 1b surrounding the outer end of the opening 1a. The opening 1a receives with clearance a smaller-diameter cylindrical projection 2a of a valve member 2 whose sealing portion or head 2b overlies the outer end of the opening and normally assumes a sealing position in which it bears against the seat 1b under the action of a biasing element here shown as a leaf spring 5. The valve member 2 is accommodated in a shallow chamber defined by a cupped cap 3 having a gas evacuating aperture 4. When the pressure in the internal compartment 1c of the housing H is sufficiently low, the spring 5 maintains the head 2b in sealing position in which the head abuts against the seat 1b and the opening 1a is properly sealed against escape of gas. If the pressure in the compartment 1c overcomes the bias of the spring 5, the head 2b moves away from the seat 1b to assume an open position so that the gas escapes through the aperture 4. The outwardly flaring marginal portion 3a of the cap 3 is externally coupled to the cover 1 by a collar 6 which forms an integral part of the cover and is upset to provide a radially inwardly extending clamping portion or flange for the marginal portion 3a of the cap. One end of the leaf spring 5 is riveted, spot welded or otherwise connected to the cap 3. One terminal 8 of the cell is connected to the inner side of the solid cover 1 by spot welding or the like. Such connection can be established with little loss in time and is reliable without affecting the sealing action between the housing H and the cover 1.

The safety valve or relief valve of FIG. 1 comprises the parts 2, 3 and 5, and the parts 3, 5 together form a retaining unit for the valve member 2. In this embodiment of our invention, the marginal portion of the cap 3 is directly coupled with the housing H, i.e., with the collar 6 of the cover 1.

Figure 2:
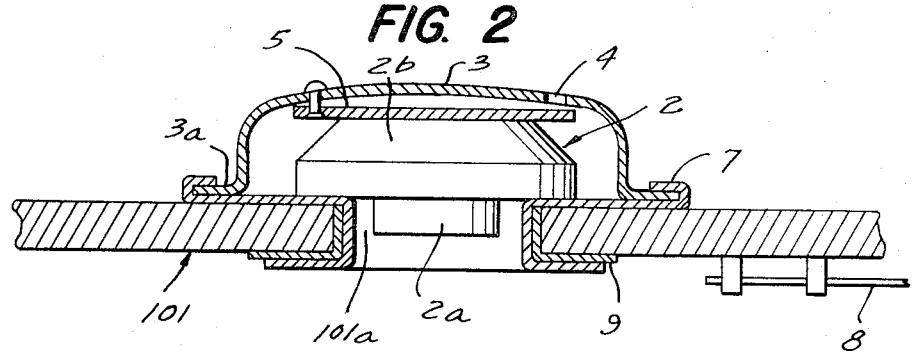
FIG. 2 is a similar fragmentary central vertical sectional view of a cell embodying a modified safety valve.

FIG. 2 illustrates a modified storage cell having a housing including a solid cover or top wall 101 provided with an opening 101a. The smaller-diameter cylindrical portion 2a of a valve member 2 extends with clearance into the opening 101a and the head 2b of the valve member is biased toward the outer side of the cover 101 by a leaf spring 5 spot-welded or otherwise connected to a cupped cap 3 having an outwardly flaring marginal portion 3a engaged by a bent-over edge portion of a coupling sleeve 7 a median portion of which is received in the opening 101a and the outermost portion of which overlies the outer side of the cover 101 around the opening 101a. Thus, the sleeve 7 actually provides a seat for the head 2b of the valve member 2. If desired, a deformable gasket 9 can be inserted between the sleeve 7 and the cover 101. The terminal 8 is connected with the cover 101 in the same way as described in connection with FIG. 1.

The sleeve 7 consists of deformable material and its end portions are deformed radially outwardly upon introduction of its median portion into the opening 101a. The edge portion of the outer end portion is thereupon bent over the marginal portion 3a of the cap 3 to hold the latter in the illustrated position. The head 2b of the valve member 2 will move to open position when the pressure in the opening 101a rises sufficiently to effect deformation of spring 5 which then permits gases to escape through the aperture 4 of the cap 3.

Figure 3:
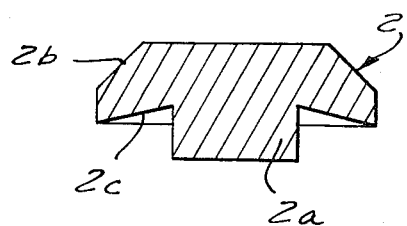
FIG. 3 is an axial sectional view of the valve member in the safety valve of FIG. 1 or 2.

In order to insure that the safety valve opens without fail when the pressure in the housing of the cell rises to a predetermined value, the head 2b of the valve member 2 may be provided with a tapering conical surface 2c (shown in FIG. 3) so that this surface is in mere linear contact with the seat.

An important advantage of the improved safety valve is that it can be produced and assembled at a low cost and that its parts need not be machined or otherwise formed with a high degree of precision. The cap, spring and sleeve can be produced in simple stamping machines and the attachment of cap to the cover or to another part of the cell housing requires no welding, soldering or riveting, i.e., such attachment can be carried out by simply deforming a portion of the cover or a portion of the coupling sleeve 7. The improved safety valve occupies very little room and its parts extend only slightly beyond the outer side of the cell housing so that they are not likely to be damaged or destroyed in storage, transport or in actual use of the cell.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a storage cell, a combination comprising a housing having an opening therein; and a safety valve for normally sealing said opening, said valve comprising a valve member having a sealing portion overlying said opening and movable with reference to said housing between a sealing position and an open position, apertured retaining means carried by and outwardly adjacent to said housing and comprising biasing means for urging said sealing portion to sealing position, and coupling means for said retaining means, said coupling means extending into said opening and defining an anular seat outwardly adjacent to said opening, said sealing portion bearing against said seat in the sealing position thereof.

2. In a storage cell, a combination comprising a housing having an opening therein; a safety valve for normally sealing said opening, said valve comprising a valve member having a sealing portion overlying said opening and movable with reference to said housing between a sealing position and an open position, and apertured retaining means outwardly adjacent to said housing and comprising biasing means bearing against said valve member for urging said sealing portion to sealing position; and tubular coupling means having a first portion extending into and lining said opening and a second portion located externally of said housing and coupled with said retaining means.

3. A combination as defined in claim 2, wherein said coupling means is a sleeve and said retaining means further comprises a cap having a gas discharging aperture and comprising a marginal portion coupled with the second portion of said coupling means.

References Cited

UNITED STATES PATENTS

| 3,415,690 | 12/1968 | Richman | 136—178 |
| 2,027,137 | 1/1936 | Yeomans | 220—44 |
| 2,790,570 | 4/1957 | Hodges et al. | |
| 3,293,081 | 12/1966 | Daley | 136—178 |

FOREIGN PATENTS

| 1,390,630 | 1/1965 | France. |
| 1,119,351 | 12/1961 | Germany. |

WINSTON A. DOUGLAS, Primary Examiner

D. L. WALTON, Assistant Examiner

U.S. Cl. X.R.

220—44